(12) United States Patent
Miller et al.

(10) Patent No.: US 10,457,388 B2
(45) Date of Patent: Oct. 29, 2019

(54) ROTOR ASSEMBLY WITH HIGH LOCK-NUMBER BLADES

(71) Applicant: Bell Helicopter Textron, Inc., Fort Worth, TX (US)

(72) Inventors: Gary Miller, North Richland Hills, TX (US); Frank B. Stamps, Colleyville, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 261 days.

(21) Appl. No.: 15/398,919

(22) Filed: Jan. 5, 2017

(65) Prior Publication Data

US 2018/0186447 A1 Jul. 5, 2018
US 2019/0061929 A9 Feb. 28, 2019

Related U.S. Application Data

(60) Provisional application No. 62/295,926, filed on Feb. 16, 2016.

(51) Int. Cl.
*B64C 27/35* (2006.01)
*B64C 27/48* (2006.01)
(Continued)

(52) U.S. Cl.
CPC .............. *B64C 27/35* (2013.01); *B64C 27/33* (2013.01); *B64C 27/48* (2013.01); *B64C 27/51* (2013.01); *B64C 27/54* (2013.01)

(58) Field of Classification Search
CPC ......... B64C 27/33; B64C 27/35; B64C 27/48; B64C 27/54; B64C 27/605; B64C 27/72; B64C 27/635; B64C 2027/7255
See application file for complete search history.

(56) References Cited

U.S. PATENT DOCUMENTS

| 3,398,797 A | 8/1968 | Mosinskis et al. |
| 3,999,886 A | 12/1976 | Ormiston et al. |

(Continued)

FOREIGN PATENT DOCUMENTS

| EP | 2653383 A1 | 10/2013 |
| WO | 2007081337 A2 | 7/2007 |

OTHER PUBLICATIONS

Braun, D., et al.; "FEL—A New Main Rotor System"; Vertica; Pergamon Press, GB; vol. 14, No. 1; XP000099607; Jan. 1, 1990; pp. 47-60.

(Continued)

*Primary Examiner* — Igor Kershteyn
(74) *Attorney, Agent, or Firm* — Lightfoot & Alford PLLC

(57) ABSTRACT

An aircraft rotor assembly has a central yoke and a plurality of rotor blades coupled to the yoke for rotation with the yoke about an axis, each blade having a Lock number of approximately 5 or greater. A lead-lag pivot for each blade is a radial distance from the axis and allows for in-plane lead-lag motion of the associated blade relative to the yoke, each pivot allowing for in-plane motion from a neutral position of at least 1 degree in each of the lead and lag directions. Lead and lag motion of each blade is opposed by a biasing force that biases the associated blade toward the neutral position, and the biasing force is selected to achieve a first in-plane frequency of greater than 1/rev for each blade.

20 Claims, 12 Drawing Sheets

(51) Int. Cl.
  *B64C 27/33* (2006.01)
  *B64C 27/54* (2006.01)
  *B64C 27/51* (2006.01)

(56) References Cited

U.S. PATENT DOCUMENTS

| | | | |
|---|---|---|---|
| 4,257,739 A | 3/1981 | Covington et al. | |
| 4,332,525 A | 6/1982 | Cheney, Jr. | |
| 4,427,340 A | 1/1984 | Metzger et al. | |
| 4,676,720 A | 6/1987 | Niwa et al. | |
| 5,141,398 A | 8/1992 | Bietenhader et al. | |
| 5,263,821 A | 11/1993 | Noehren et al. | |
| 5,372,479 A | 12/1994 | Byrnes et al. | |
| 5,407,325 A * | 4/1995 | Aubry | B64C 27/51 416/106 |
| 5,562,416 A * | 10/1996 | Schmaling | B64C 27/48 416/134 A |
| 6,196,800 B1 | 3/2001 | Bauer et al. | |
| 6,769,872 B2 * | 8/2004 | Torok | B64C 27/615 416/1 |
| 6,932,569 B2 * | 8/2005 | Torok | B64C 27/615 416/1 |
| 8,123,483 B2 * | 2/2012 | Beroul | B64C 27/51 416/140 |
| 8,444,382 B2 | 5/2013 | Stamps et al. | |
| 8,496,435 B2 * | 7/2013 | Nannoni | B64C 27/32 416/134 A |
| 8,622,703 B2 * | 1/2014 | Girard | B64C 27/35 416/134 A |
| 8,695,917 B2 * | 4/2014 | Cranga | B64C 27/001 188/379 |
| 8,882,462 B2 * | 11/2014 | Schmaling | B64C 27/322 416/103 |
| 8,926,281 B2 * | 1/2015 | Stamps | B64C 27/35 416/134 A |
| 2015/0298801 A1 | 10/2015 | Schmaling | |

OTHER PUBLICATIONS

Gotzfried, K.; Survey of TIGER Main Rotor Loads from Design of Flight Test; Journal of the American Helicopter Society; Alexandria, VA; vol. 47, No. 4; XP001130300; Oct. 1, 2002; pp. 285-296.
Vorwerg, R.O., et al.; "Dynamic Blade Selection—a procedure to get inter-changeability of the modern EC135—main rotor blades"; International Annual Forum of the American Helicopter Society; XP000199491; Jan. 1, 1997; pp. 258-270.
European Search Report in related European Patent Application No. 17154785.4, dated Aug. 21, 2017, 6 pages.
Exam Report in related European Patent Application No. 17154785A, dated Sep. 19, 2017, 14 pages.
European Exam Report in related European Patent Application No. 17154785.4, dated May 11, 2018, 7 pages.
European Search Report in related European Patent Application No. 17156379.4 dated Aug. 10, 2017, 5 pages.
Exam Report in related European Patent Application No. 17156379.4, dated Sep. 4, 2017, 10 pages.
European Exam Report in related European Patent Application No. 17156379.4 dated Mar. 29, 2018, 5 pages.
Exam Report in related Canadian Patent Application No. 2,995,295, dated Feb. 19, 2019, 4 pages.

* cited by examiner

ROTOR ASSEMBLY WITH HIGH LOCK-NUMBER BLADES

BACKGROUND

The Lock number is a dimensionless parameter for aircraft rotor blades, and the equation is $$\gamma = \rho a c R^4 / I_b,$$

where
- $\gamma$ = Lock number
- $\rho$ = air density
- $a$ = slope of the 2-D airfoil lift curve
- $c$ = chord length
- $R$ = rotor radius
- $I_b$ = flapping moment of inertia.

The Lock number represents the ratio of aerodynamic forces, which act to lift the blade, to inertial forces, which act to maintain the blade in the plane of rotation. Typical rotorcraft blades have a Lock number of between 3 and 12.

The inertial forces are based on the mass of each blade, so a larger blade tends to have a lower Lock number. For example, a two-blade helicopter rotor typically has blades with high inertia, and this is due to the size of each blade required to achieve the desired amount of lift. However, a rotor can provide the same or more lift by using a larger number of smaller and lighter (higher Lock number) blades. This reduces the mass and total inertia of the rotor and reduces the loads that must be reacted by the rotor hub, allowing for a lighter hub. Another advantage to reducing rotor mass and inertia is that the jump-takeoff load, which is used to design the roof structure, increases with rotor inertia. In addition, reducing the mass of the rotor reduces the load it applies to the fuselage in a crash. Therefore, reducing the mass of the rotor may allow for a lighter fuselage design, with fuselage mass perhaps being reduced by twice the amount removed from the rotor.

Another engineering consideration is that the combined inertia of the blades be high enough to allow for autorotation after engine failure, so single-engine aircraft typically have high-inertia rotors, whereas multi-engine aircraft can use rotors with less inertia. One way to achieve higher inertia is to add tip weights to the blades, but another way is to add blades to the rotor. As described above, adding narrower, lighter blades with a higher Lock number can allow for an aircraft with reduced weight in both the rotor system and the fuselage.

Using an increased number of narrower blades has other advantages. One advantage is that reducing the chord width reduces material cost for each blade, which can significantly reduce the price of a shipset of blades. Also, the rotor is quieter during operation due to the reduced blade noise, which tends to vary with chord width, and to the increased number of blade passages, which coalesce into a higher frequency and less offensive sound.

DETAILED DESCRIPTION

Figure 1:
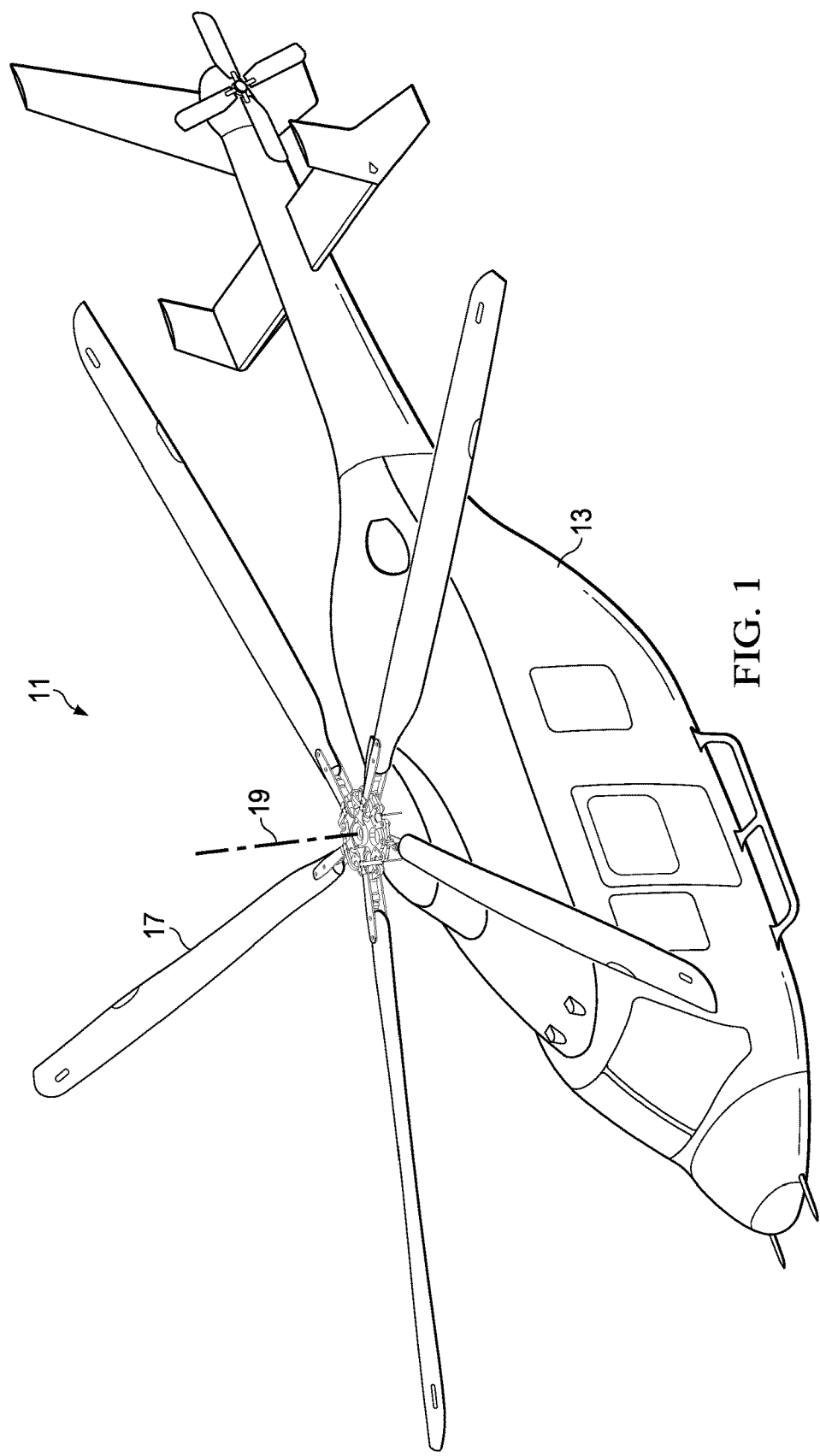
FIG. 1 is an oblique view of an aircraft comprising a rotor assembly according to this disclosure.
Figure 2:
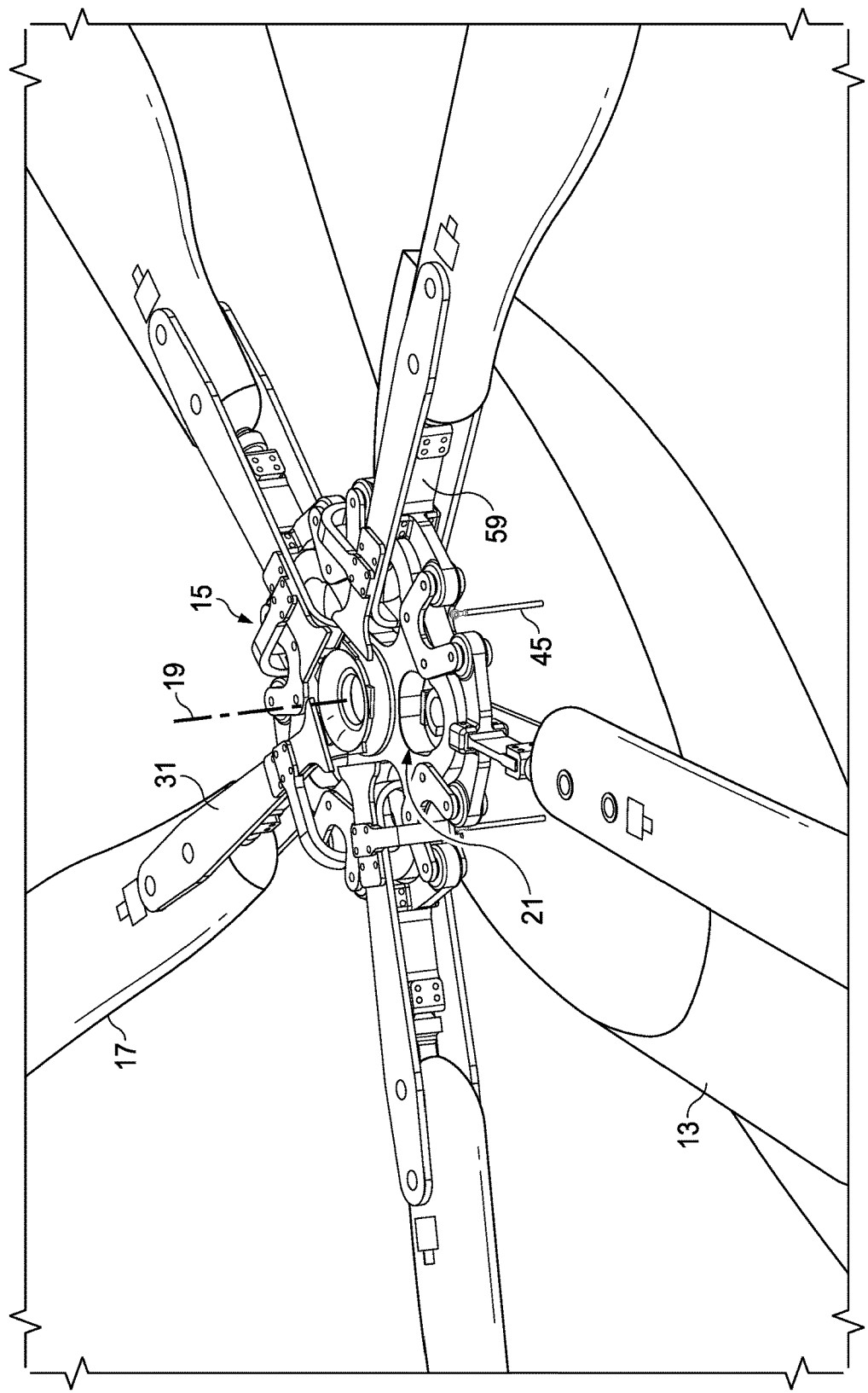
FIG. 2 is an oblique view of a portion of the aircraft of FIG. 1 and showing the rotor assembly.
Figure 3:
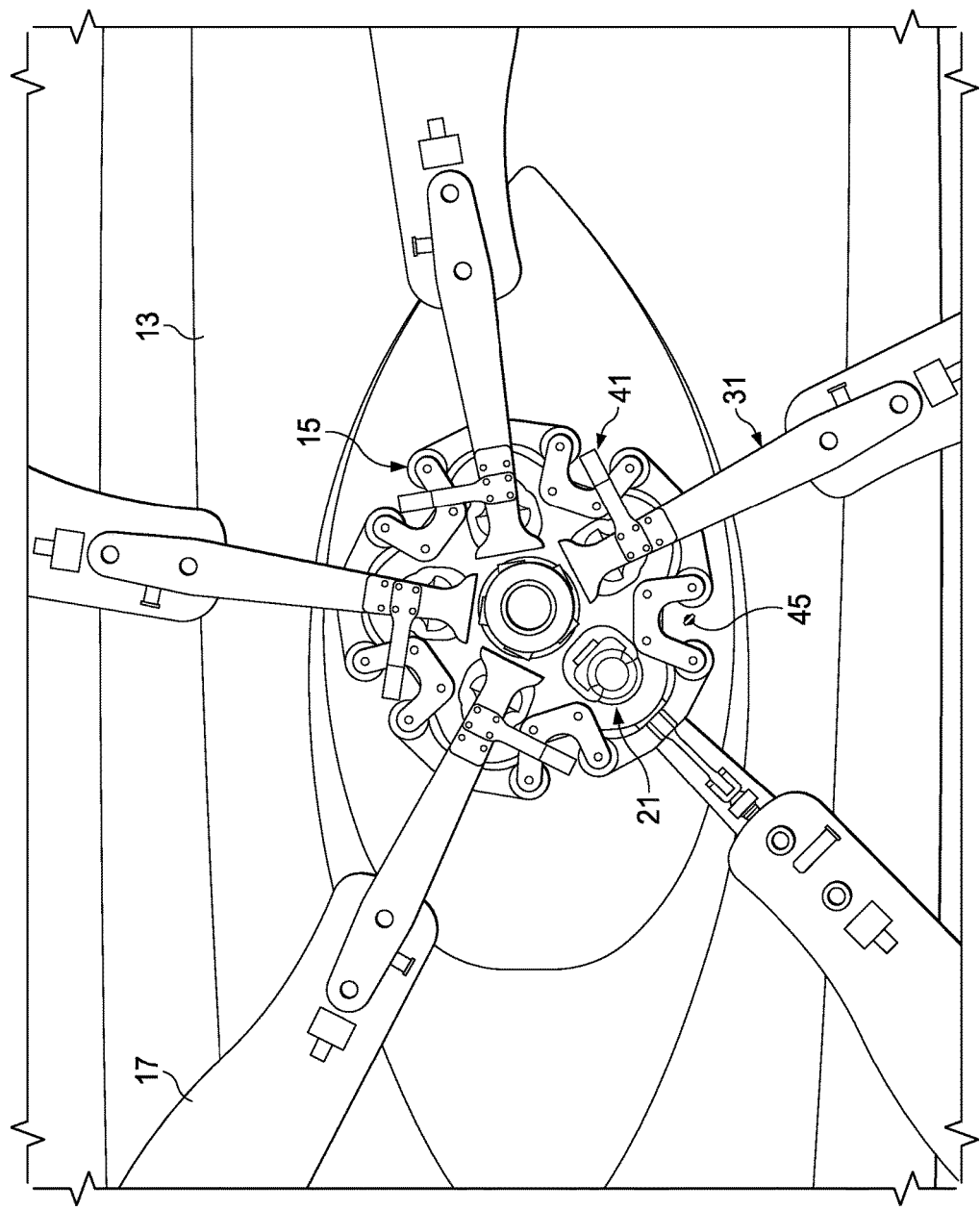
FIG. 3 is a top view of a portion of the aircraft of FIG. 1 and showing the rotor assembly.
Figure 4:
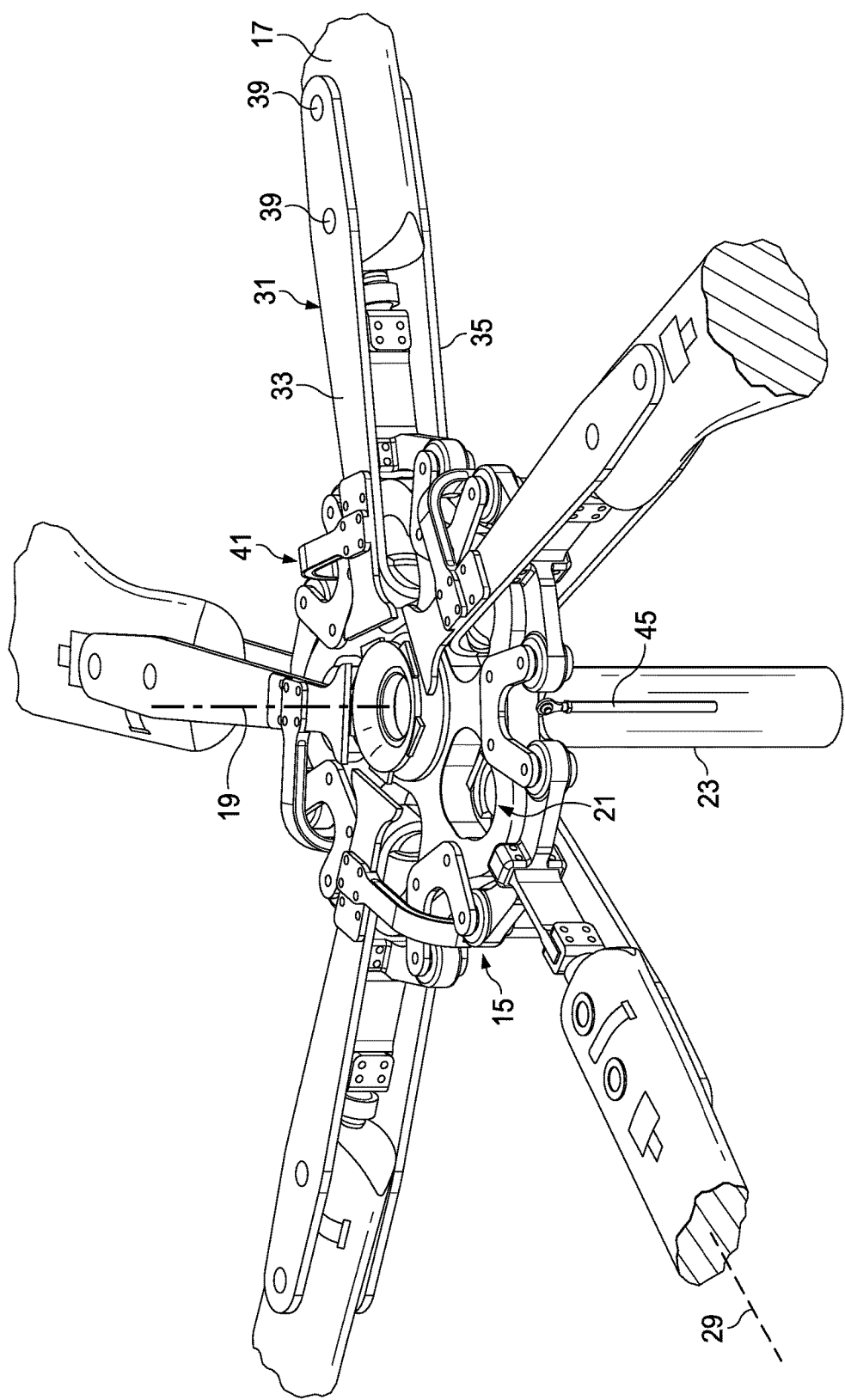
FIG. 4 is an oblique isolation view of the rotor assembly of FIG. 1, some components being removed for ease of viewing.
Figure 5:
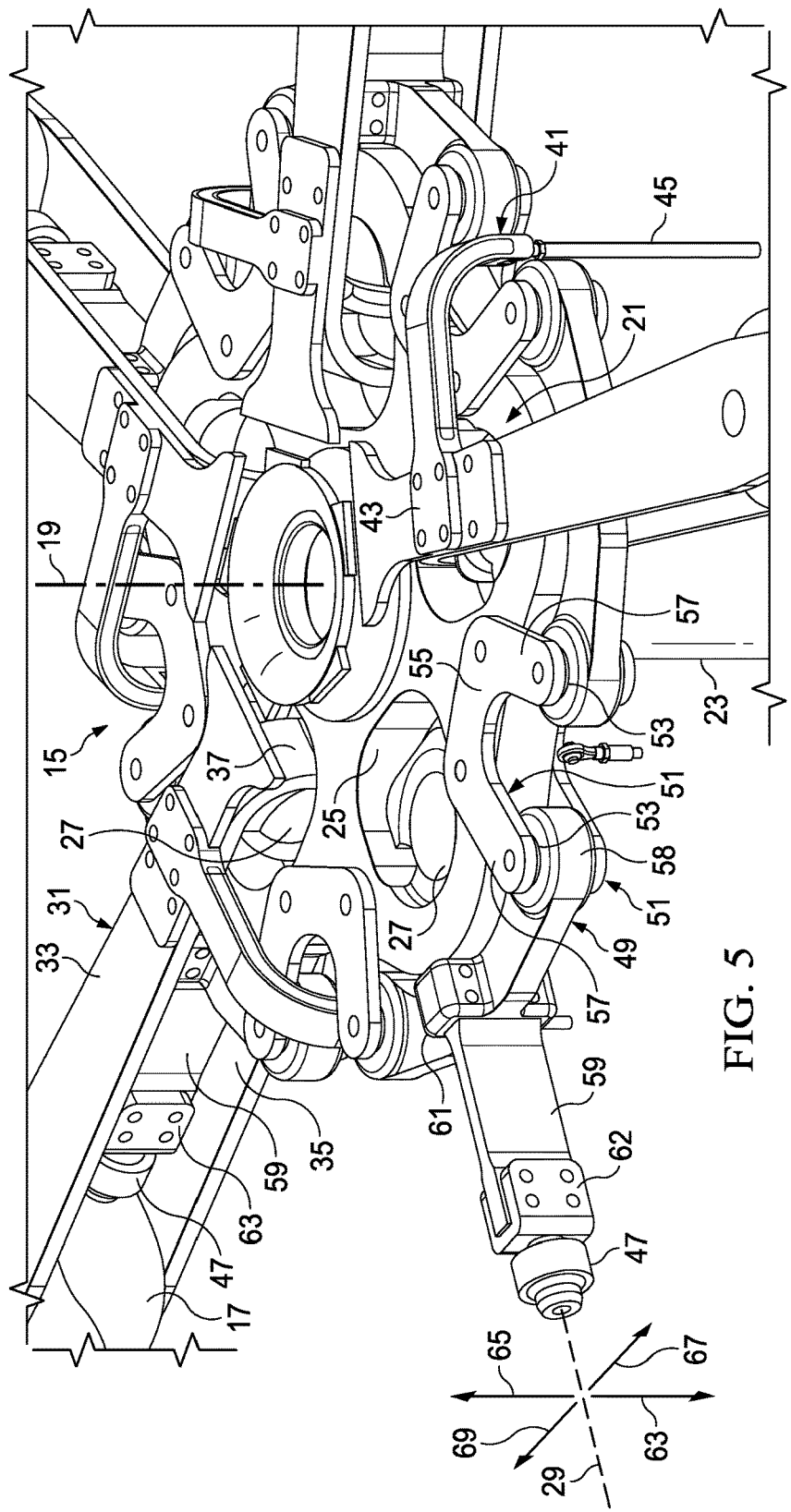
FIG. 5 is an oblique view of the rotor assembly of FIG. 1, some components being removed for ease of viewing.
Figure 6:
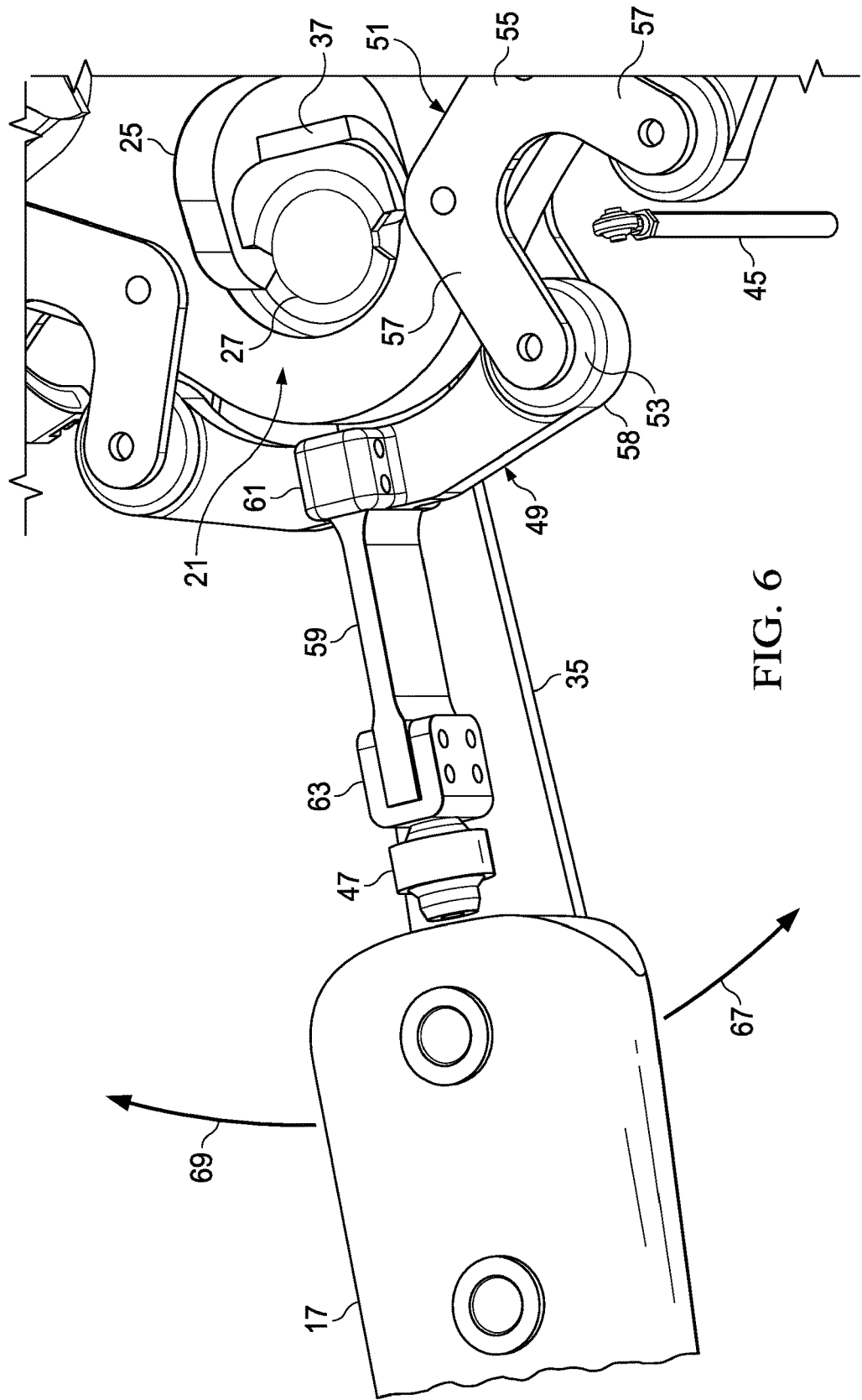
FIG. 6 is an oblique view of a portion of the rotor assembly of FIG. 1, some components being removed for ease of viewing.

In the specification, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges a new concept for rotor assemblies that are stiff-in-plane and soft out-of-plane while using high Lock-number blades and with a first in-plane frequency over 1/rev and requiring no dampers.

The Lock number of a blade and its first in-plane frequency correlate directly, so that, all other things being equal, a higher Lock number produces a higher in-plane frequency. Two ways to adjust the first in-plane frequency are to soften the yoke in the chord, or in-plane, direction or add tip weight to the blade. Adding tip weight is contrary to the goal of reducing the mass of the aircraft, so removing stiffness from the yoke is a preferred way to achieve the desired frequency. With stiff and/or light blades, the required yoke stiffness in the chordwise direction falls to the point that the system is still a stiff-in-plane rotor but allows the blade to move relative to the yoke in in-plane lead and lag directions enough to reduce loads in the rotor.

Because the fundamental loads on a rotor blade are a function of mass, a reduction in mass results in a reduction of load, and this new rotor configuration could not have existed prior to the development of very stiff and light materials for bade construction. Allowing a blade to move relative to the yoke reduces loads, and the loads are inversely proportional to the amount of movement. Additional mass savings are achieved by there being no need for lead-lag dampers, as the configuration produces an in-plane natural frequency above 1/rev. This type of rotor design leads to solutions with more blades than traditional helicopters, but the loads, weight, noise, vibration, and cost are reduced when the weight and chord width of the blades are reduced, as with a high Lock-number blade.

Typically, the expectation is that being stiff-in-plane means that a rotor is rigid, with a first in-plane frequency of >1/rev and lead-lag motion of less than 1 degree in each of the lead and lag directions with no lead-lag hinge. In fact, stiff-in-plane and rigid rotors have 1st in-plane frequencies that are similar for blades with a Lock number of approximately 4 or less, but the frequencies for these types of rotors begin to diverge when blade Lock numbers are approximately 5 and above. By a Lock number of 10, they have diverged greatly.

The rotor designs according to this disclosure fall under the definition of a stiff-in-plane rotor but allow the blades to move as much as a soft-in-plane rotor, with lead-lag motion of greater than 1 degree in each direction. Because of the need to keep first in-plane frequencies on either side of 1/rev, a soft-in-plane rotor requires dampers to keep the frequency below 1/rev, whereas the rotor designs according to this disclosure require no dampers and have a frequency above 1/rev. These rotor designs will typically use blades having a Lock number of approximately 6 to approximately 11, but particular applications may use a higher Lock number. For example, a large helicopter may have a high number of skinny blades formed from a high-stiffness material, such as graphite, and having a Lock number of, for example, up to 14.

While the rotor designs according to this disclosure have advantages for helicopter application, tiltrotor applications can have greater gains when compared to current rotor designs. There is no requirement in a tiltrotor to have enough rotor mass for autorotation, so rotors may be configured to use blades having a Lock number of, for example, 12 or higher, and the upper limit on the Lock number used may only be from the limits of blade construction. Additionally, tiltrotors have stability issues in whirl mode, which is an aerodynamic term that includes rotor mass, and a higher rotor mass leads to an undesirable increase in whirl. Therefore, using reduced-mass rotors, such as those according to this disclosure, on a tiltrotor will result in less whirl. Another advantage is that the reduced mass of high Lock-number blades further increases the advantage that aerodynamic forces of the blades have over the inertial mass forces. A tiltrotor rotor does not normally cone much during flight in airplane mode due to the reduced thrust force when compared to helicopter mode, but the reduced mass of the blades may allow for a combination of sensors and improved swashplate control to cause coning of the rotors during airplane mode to increase the distance between the blades and the wing.

In a specific tiltrotor example, the first in-plane frequency for the three-blade rotors on a Bell/Boeing V-22 tiltrotor is 1.23/rev, and it may be desirable to increase the frequency to 1.5/rev. A four-blade rotor design according this disclosure and used on a V-22 will have the desired increase in frequency but will also reduce mass of the rotors, and the reduction may be as much as 1000 lbs per rotor. This leads to reduction in the mass of other aircraft components, such as the fuselage, landing gear, etc., and this multiplier effect leads to a significantly reduced overall mass of the aircraft.

FIG. 1 illustrates an aircraft 11 comprising a main rotor assembly according to this disclosure. Aircraft 11 comprises a fuselage 13 and a rotor assembly 15 with a plurality of blades 17. Each blade 17 has a Lock number of approximately 5 or greater. Rotor assembly 15 is driven in rotation about mast axis 19 by torque provided by an engine housed within fuselage 13. Though aircraft 11 is shown as a helicopter having a single main rotor, rotor assembly 15 can alternatively be used on other types of aircraft, such as, but not limited to, helicopters having more than one main rotor or on tiltrotor aircraft. Also, rotor assembly 15 is shown as a main rotor for providing vertical lift and requiring collective and cyclic control, though rotor assembly 15 may alternatively be configured to provide longitudinal or lateral thrust, such as in a helicopter tail rotor or airplane propeller.

FIGS. 2 through 6 illustrate rotor assembly 15, various components being removed for ease of viewing. A central yoke 21 is coupled to a mast 23 (shown in FIG. 4) for rotation with mast 23 about mast axis 19. Yoke 21 has a honeycomb configuration in the embodiment shown, though in other embodiments yoke 21 may have another configuration, such as a central portion with radially extending arms. Yoke 21 is preferably formed from a composite material, though yoke 21 may be formed from any appropriate material. In the embodiment shown, yoke is configured for use with five rotor blades, though yoke 21 may be configured for use with any appropriate number of blades.

Yoke 21 has a bearing pocket 25 for each blade 17, each pocket 25 carrying a spherical bearing 27. Each bearing 27 is spaced a radial distance from axis 19 and transfers centrifugal force from the associated blade 17 to yoke 21. Each bearing 27 forms a lead-lag pivot to allow for limited rotation of the associated blade 17 relative to yoke 21 in in-plane lead-lag directions, and bearing 27 also allows for limited rotation in out-of-plane flapping directions and limited rotation about a pitch axis 29. While each blade 17 can lead-lag about the associated bearing 27, during operation the centrifugal force tends to force each blade 17 toward a centered, neutral position, from which each blade 17 can lead, by rotating forward (in the direction of rotation about mast axis 19) in-plane relative to yoke 21, or lag, by rotating rearward in-plane relative to yoke 21.

A blade grip 31 couples each blade 17 to the associated bearing 27, each grip 31 being shown as an elongated U-shaped structure, comprising an upper plate 33, a lower plate 35, and a curved inner portion 37 connecting plates 33, 35. Each grip 31 is connected to an inner end of a blade 17 with fasteners 39, thereby allowing loads from each blade 17 to be transferred through grip 31 and inner bearing 27 to yoke 21. A pitch horn 41 is mounted to each grip 31 by an integral plate 43, allowing for actuation by a flight control system of a pitch link 45 coupled to pitch horn 41 for causing rotation of grip 31 and blade 17 together about pitch axis 29 for cyclic and collective control of blades 17.

To provide for a stiff-in-plane configuration, each blade 17 and/or grip 31 is coupled to an outer bearing, such as outboard shear bearing 47, supported by an in-plane flexure assembly. The following describes the flexure assembly for one blade 17, but, in the embodiment shown, each blade 17 has its own flexure assembly.

Each end of an elongate outboard bearing support 49 is coupled to yoke 21 by upper and lower brackets 51 using spherical bearings 53, allowing for bearing support 49 to rotate only in out-of-plane directions (away from or toward fuselage 13). This provides a discrete flap hinge, allowing for a limited amount of flapping and coning motion of the associated blade 17. Each bracket 51 is U-shaped and comprises a base portion 55, which is fastened rigidly to an outer portion of yoke 21, and two radially extending arms 57, which extend beyond the periphery of yoke 21. As visible in the figures, the U-shape of brackets 51 allows pitch link 45 to be located and operate between arms 57. The inner portion of each bearing 53 is fastened within a clevis formed by corresponding arms 57 of two brackets 51, and the outer portion of each bearing 53 is installed in a bearing pocket 58 of bearing support 49, such that bearing support 49 can rotate as described relative to brackets 51 and yoke 21 for flapping and coning motions of blade 17.

A lead-lag flexure 59 is rigidly fastened at the inner end to a central boss 61 of bearing support 49, and shear bearing 47 is rigidly fastened by clevis 62 to the outer end of flexure 59. Shear bearing 47 is coupled to grip 31 (coupling not shown) for providing shear support of blade 17 and cooperates with inner bearing 27 to define pitch axis 29. Flexure 59 is preferably formed from a composite material, though flexure 59 can alternatively be formed from another appropriate material or combination of materials. For example, flexure 59 may be formed solely from fiberglass or a similar composite, or flexure from a combination of materials, such as with a laminated construction.

In the embodiment shown, flexure 59 is formed as a beam having a generally rectangular cross-section, with flexure 59 oriented to have a bending stiffness greater in the out-of-plane directions, shown by arrows 63, 65, than a bending stiffness in the in-plane directions, indicated by arrows 67, 69. This means that flexure 59 is stiff to out-of-plane flapping motions of the associated blade 17, and the flapping motion occurs with movement relative to yoke 21 of bearing support 49 at bearings 53. However, flexure 59 acts as a spring by bending through elastic deformation to allow for a selected amount of rotation of the associated blade 17 at least 1 degree in each of the lead and lag directions, the bending of flexure 59 producing a biasing force opposing the lead-lag motions and biasing the blade toward the neutral position. This allows for selection of the in-plane stiffness of flexure 59 to "tune" the first in-plane frequency to be above 1/rev, and no dampers are required to achieve the desired frequency. This configuration is a new class of rotor assembly, which may be termed a "compliant stiff-in-plane" rotor.

FIGS. 7 through 12 illustrate alternative embodiments of a rotor assembly according to this disclosure. Like rotor assembly 15, as described above, these additional embodiments, and variations thereof, use blades with a high Lock number of approximately 5 or greater to achieve a reduced-mass rotor. The configurations each have lead-lag pivots radially spaced from the mast axis and allowing for in-plane lead-lag motion of the blades of at least 1 degree in each direction from a neutral position, components for producing a biasing force through elastic deformation that opposes lead-lag motion of the blades and that bias the blades toward the neutral position, and a first in-plane frequency above 1/rev without the need for dampers. As with rotor assembly 15, shown and described above, these alternative embodiments are shown as a single main rotor assembly for a helicopter, those these rotor assemblies can alternatively be used on other types of aircraft, such as, but not limited to, helicopters having more than one main rotor or tiltrotors. Also, these rotor assemblies are shown as a main rotor for providing vertical lift with collective and cyclic control, though they may alternatively be configured to provide longitudinal or lateral thrust, such as in a helicopter tail rotor or airplane propeller.

Figure 7:
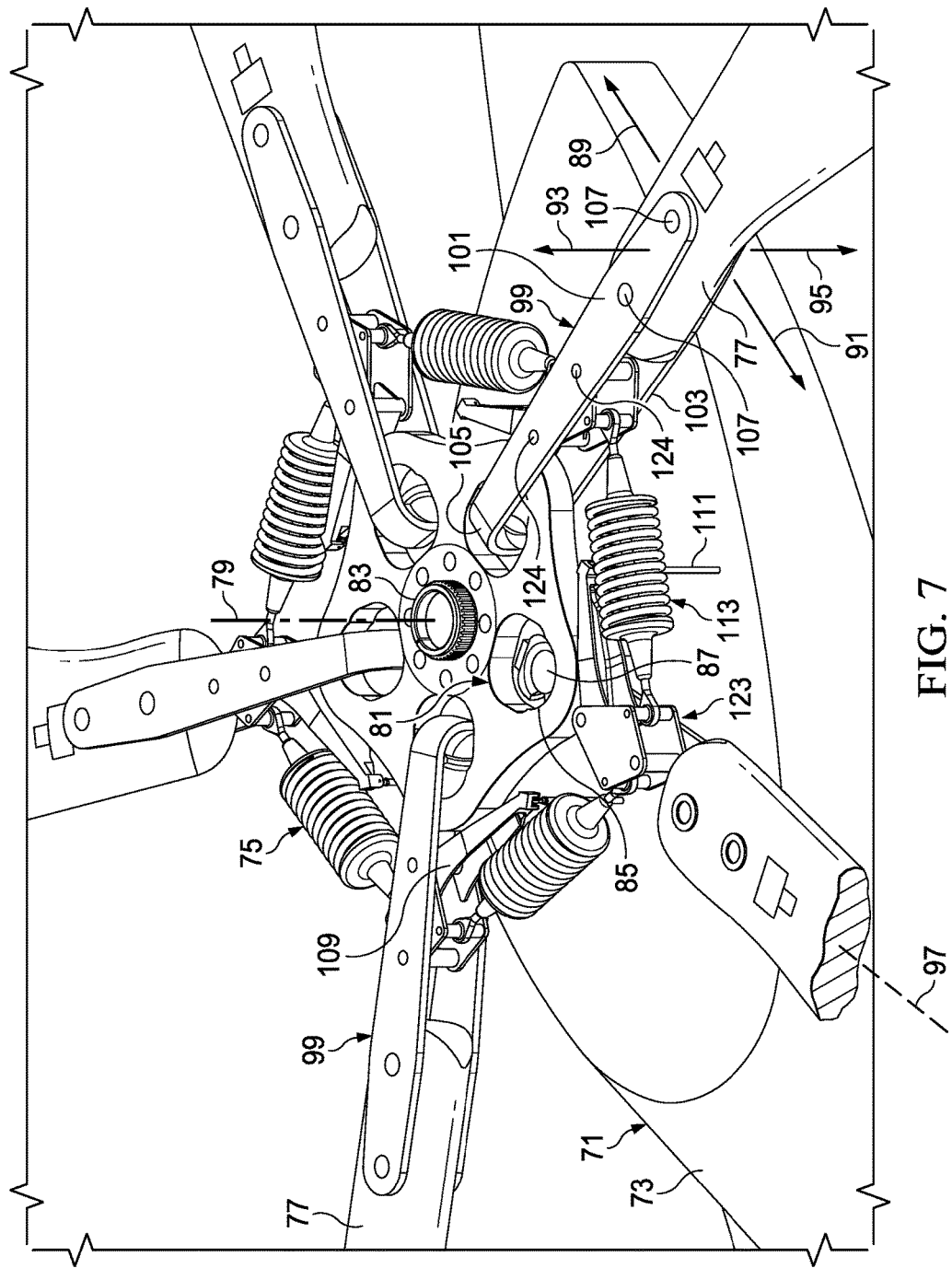
FIG. 7 is an oblique view of a portion of an aircraft having an alternative embodiment of a rotor assembly according to this disclosure.
Figure 8:
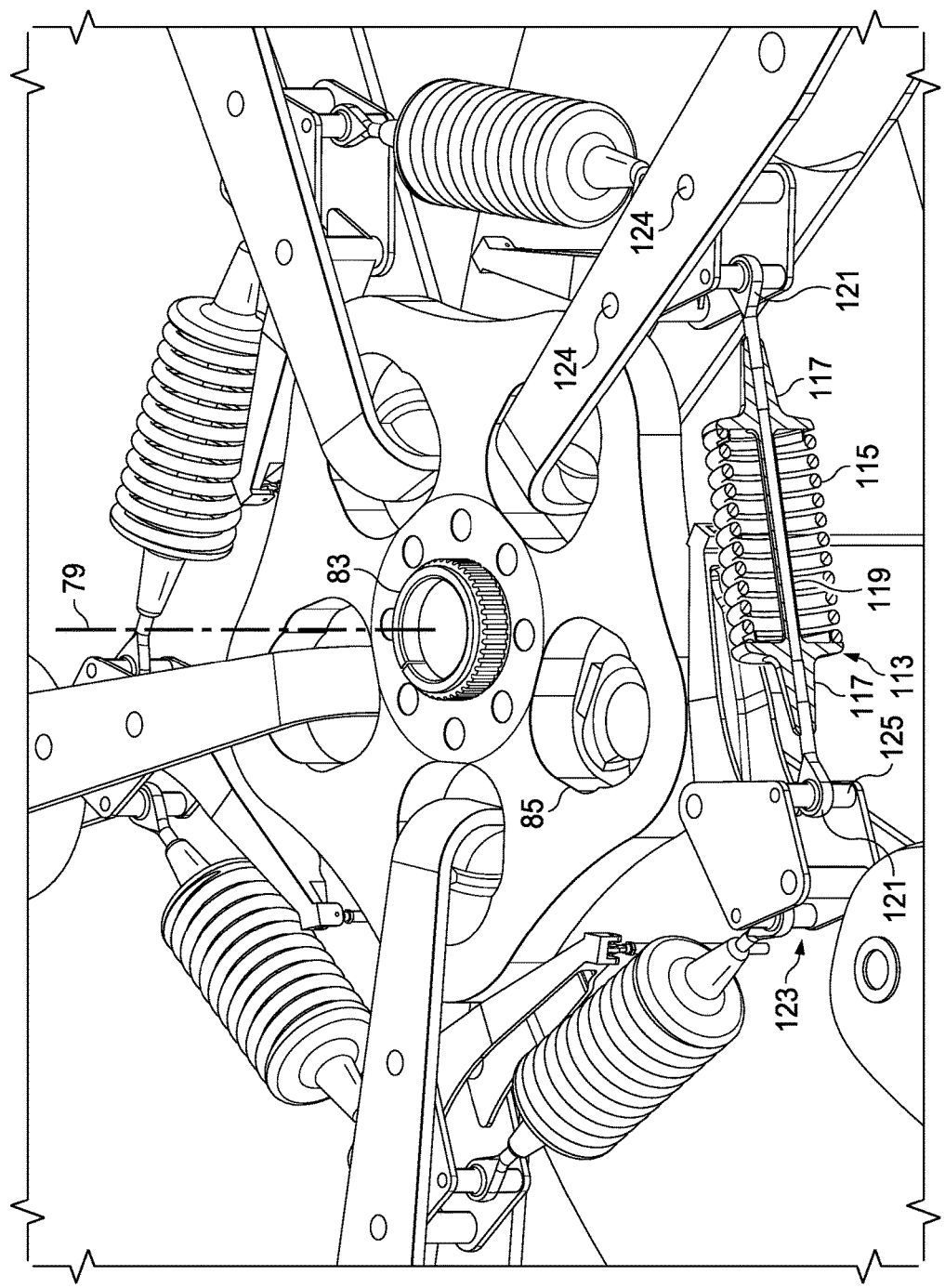
FIG. 8 is an oblique view of the portion of the aircraft of FIG. 7 and showing the alternative embodiment of the rotor assembly.

FIGS. 7 and 8 illustrate an alternative embodiment of a rotor assembly according to this disclosure, the views having various components removed for ease of viewing. Aircraft 71 comprises a fuselage 73 and a rotor assembly 75 with a plurality of blades 77. Rotor assembly 75 is driven in rotation about mast axis 79 by torque provided by an engine housed within fuselage 73.

In rotor assembly 75, a central yoke 81 is coupled to a mast 83 for rotation with mast 83 about mast axis 79. Yoke 81 has a honeycomb configuration in the embodiment shown, though in other embodiments yoke 81 may have another configuration, such as a central portion with radially extending arms. Yoke 81 is preferably formed from a composite material, though yoke 81 may be formed from any appropriate material. In the embodiment shown, yoke is configured for use with five rotor blades, though yoke 81 may be configured for use with any appropriate number of blades. Yoke 81 has a bearing pocket 85 for each blade 77, each pocket 85 carrying a spherical bearing 87, which transfers centrifugal force from the associated blade 77 to yoke 81. Each bearing 87 allows for limited rotation of the associated blade 77 relative to yoke 81 in in-plane lead and lag directions, as indicated by arrows 89, 91, respectively, and in out-of-plane flapping directions, as indicated by arrows 93, 95. Each bearing 87 also allows for limited rotation of the associated blade 77 about a pitch axis 97 for changing the pitch of blade 77.

A blade grip 99 couples each blade 77 to the associated bearing 87, each grip 91 being shown as an elongated U-shaped structure, comprising an upper plate 101, a lower plate 103, and a curved inner portion 105 connecting plates 101, 103. Each grip 99 is connected to an inner end of blade 77 with fasteners 107, thereby allowing loads from each blade 77 to be transferred through grip 99 and bearing 87 to yoke 81. Each bearing 87 forms a lead-lag pivot, allowing for lead-lag motion of the associated blade. A pitch horn 109 is installed on each grip 99, allowing for actuation by a flight control system of a pitch link 111 coupled to pitch horn 109 for causing rotation of grip 99 and blade 77 together about pitch axis 97 for cyclic and collective control of blades 77. Though not shown, a droop stop limits droop of each blade 77 and grip 99 assembly toward fuselage 73 when rotor is slowly rotating about mast axis 79 or at rest.

Each blade 77 is coupled to each adjacent blade 77 by a spring assembly 113, each spring assembly 113 providing a biasing force and cooperating with each adjacent spring assembly 113 to bias each associated blade 77 toward a neutral position in lead-lag directions 89, 91. Each spring assembly 113 comprises a spring 115, a spring perch 117 at each end of spring 115, and a telescoping stabilizing rod 119 extending between perches 117. Spring 115 may be formed from metal, as shown, or spring 115 may be formed from a composite material or a low-damped elastomer, and these may require a different configuration for spring assembly 113. A connector, such as rod end bearing 121, is installed at each end of spring assembly 113.

To provide for coupling of spring assemblies 113 to grips 99, a spring block 123 is rigidly coupled to each grip 99 with fasteners 124, and each spring block 123 comprises a pair of shafts 125 sized for receiving rod end bearings 121. When assembled, each spring assembly 113 can be rotated a limited amount relative to each spring block 123, allowing for the assemblies of grips 99 and blades 77 to move in lead and lag directions relative to each other and to yoke 81. Also, the biasing force of each spring assembly 113 is transferred to each grip through a spring perch 117 and associated bearing 121 and into spring block 123 for biasing grips 99 to control relative motion between grips 99 and their associated blades 77. Selection of the biasing force of springs 115 allows for tuning of the in-plane frequencies without the need for dampers.

The configuration of rotor assembly 75 allows blades 77 to "pinwheel" relative to yoke 81, in which all blades 77 rotate in the same lead or lag direction relative to yoke 81, and this may especially occur in lag direction 91 during initial rotation about mast axis 79 of rotor assembly 75 from rest. As the centrifugal force on blades 77 builds with their increased angular velocity, blades 77 will rotate forward in the lead direction 89 to their angular neutral position relative to yoke 81.

Figure 9:
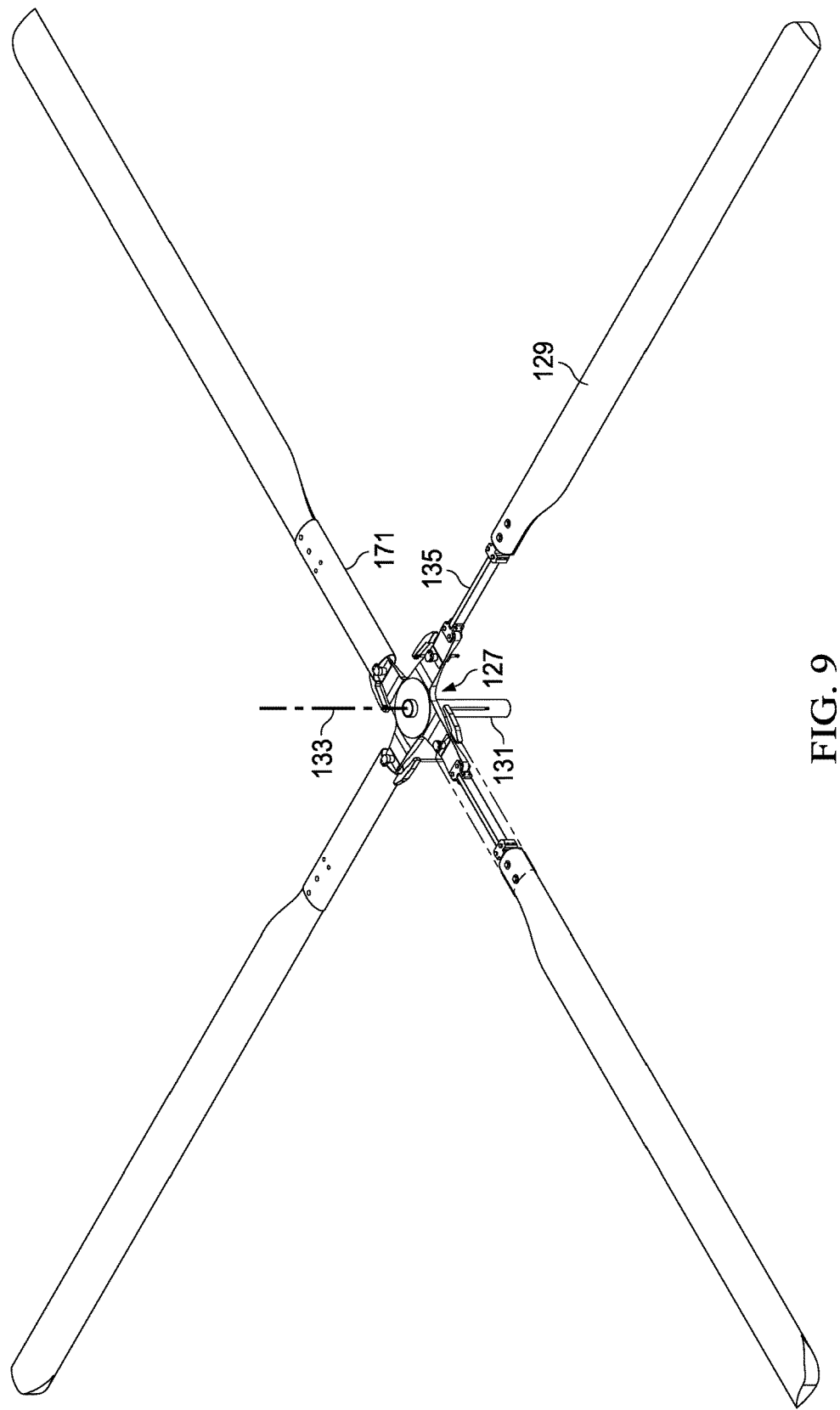
FIG. 9 is an oblique view of another alternative embodiment of a rotor assembly according to this disclosure, some components being removed for ease of viewing.
Figure 10:
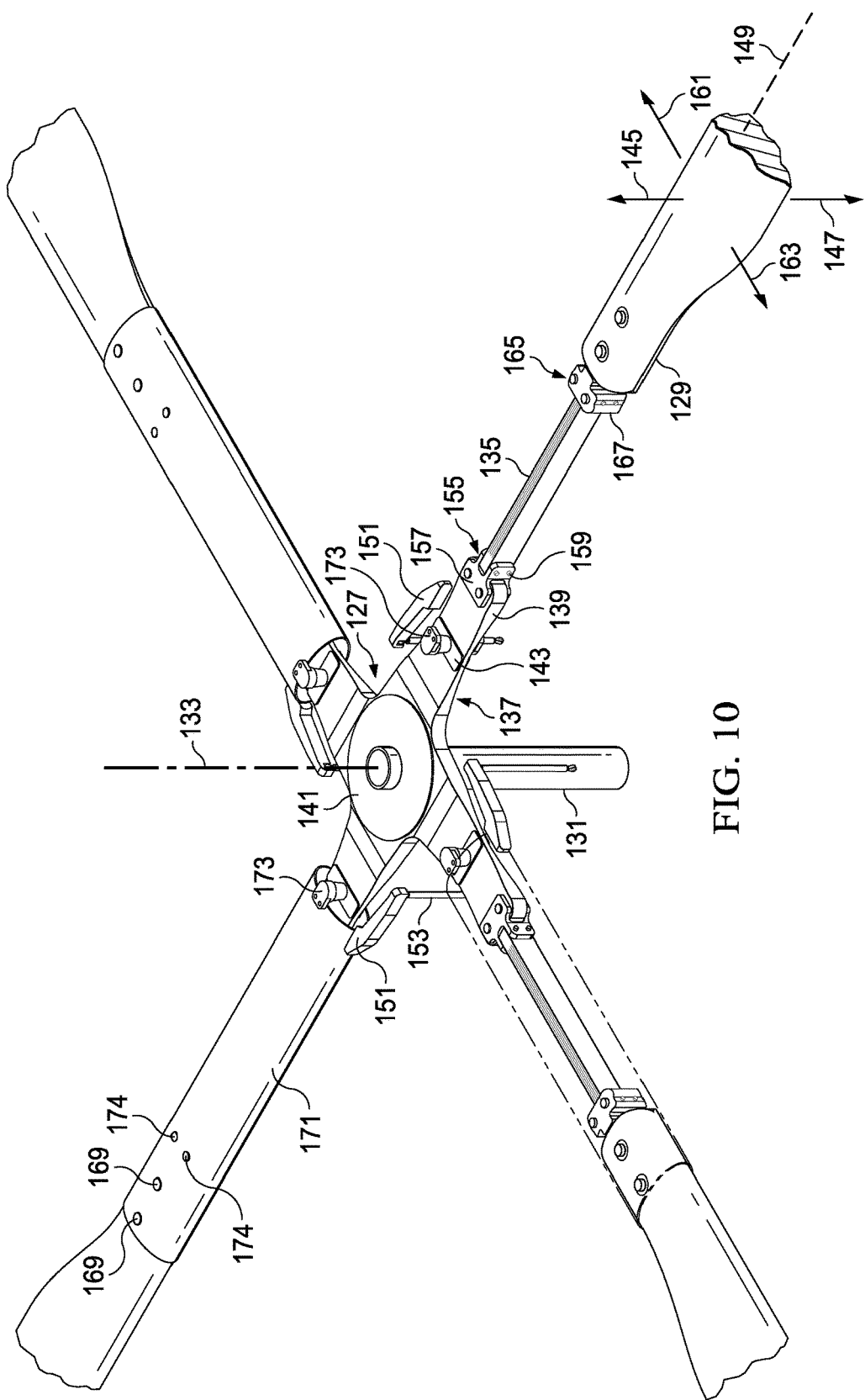
FIG. 10 is an oblique enlarged view of the rotor assembly of FIG. 9.

FIGS. 9 and 10 illustrate another alternative embodiment of an aircraft rotor assembly 127 according to this disclosure, the views having various components removed for ease of viewing. Rotor assembly 127 has a plurality of blades 129 and is driven in rotation by mast 131 about mast axis 133 by torque provided by an engine of an aircraft (both not shown).

Rotor assembly 127 is similar in configuration to rotor assembly 15 described above, in that assembly 127 has a lead-lag flexure 135 for each blade 129, flexures 135 providing a biasing force for biasing the associated blade 129 toward a neutral lead-lag position relative to a central yoke 137. Flexures 135 are similar in construction to flexures 59, described above, flexures 135 preferably being formed from a composite material or any appropriate material or combination of materials.

Unlike yoke 21 of rotor assembly 75, yoke 137 comprises radially extending arms 139 extending from a central section 141. In the embodiment shown, each arm 139 has a flexible portion 143 that acts as a flexural flap hinge, allowing for out-of-plane flapping motion of an outer portion of the associated arm 139 and blade 129 together relative to central section 141 in directions indicated by arrows 145, 147. In addition, flexible portion 143 allows for limited rotation of the outer portion of each arm 139 and blade 129 together about pitch axis 149 through force applied to a pitch horn 151 by a pitch link 153.

A flexure mount 155 mounts each flexure 135 to the outer end of an associated arm 139, each mount 155 having an arm clevis 157 configured for attachment to the outer end of arm 139 and a flexure clevis 159 configured for attachment to the inner end of flexure 135. For each mount 155, flexure clevis 159 is clocked 90 degrees from the orientation of arm clevis 157, thereby orienting the attached flexure 135 to provide a bending stiffness in flapping directions 145, 147 greater than a bending stiffness in the lead and lag directions, indicated by arrows 161, 163, respectively. A blade mount 165 couples each blade 129 to the associated flexure 135, each mount 165 having a flexure mount 167 and being coupled rigidly coupled to an inner end of blade 129 by fasteners 169. A grip 171 extends inward from the inner end of each blade 129 to a lead-lag bearing 173, which forms a lead-lag pivot for grip 171 and associated blade 129 to move together relative to yoke 137 in lead-lag directions 161, 163. Each grip 171 is coupled to blade mount 165 by fasteners 174. As a blade 129 rotates about the associated lead-lag bearing 173 from the neutral position, the associated flexure 135 acts as a spring to provide a biasing force to bias the blade toward the neutral position.

Figure 11:
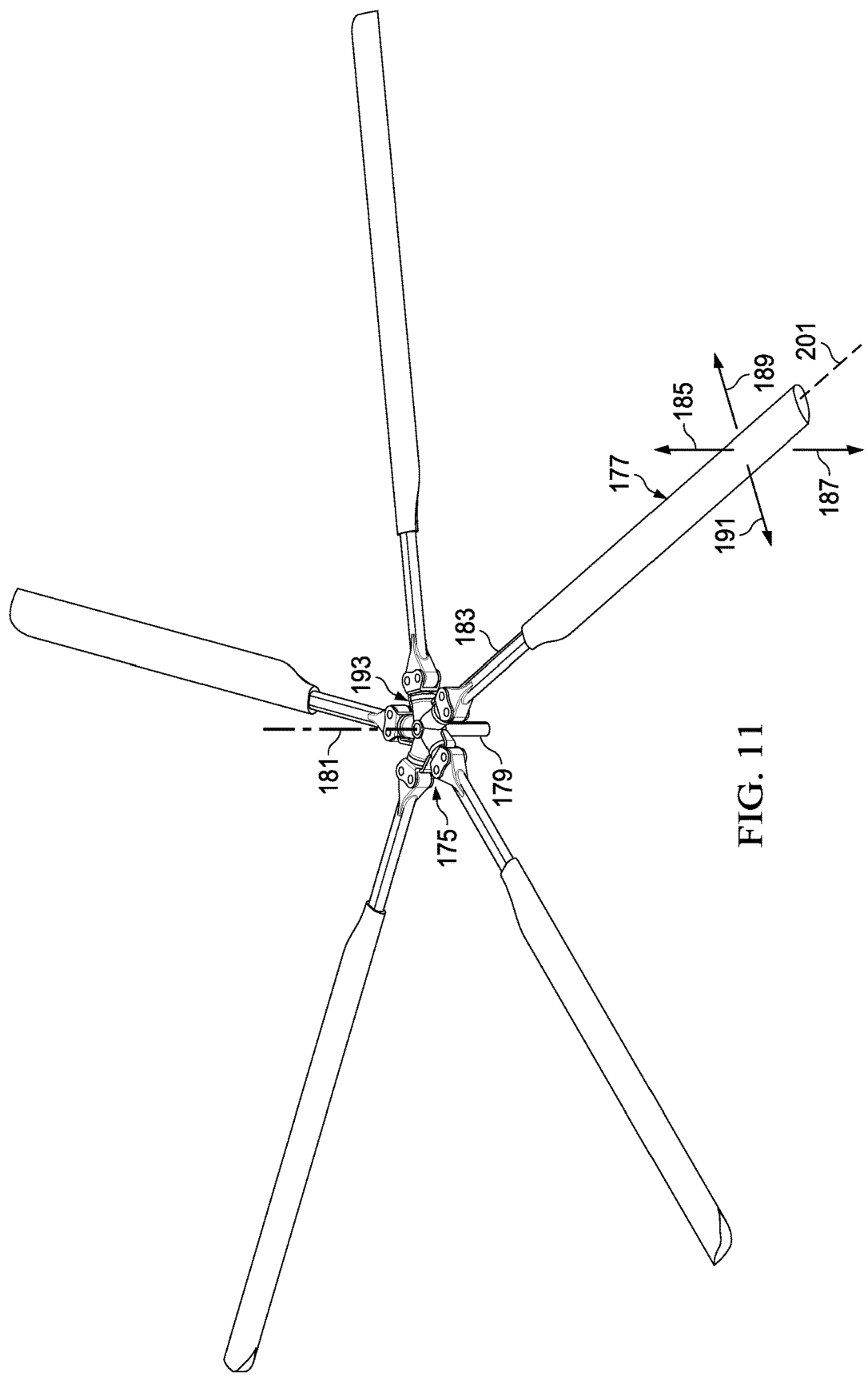
FIG. 11 is an oblique view of another alternative embodiment of a rotor assembly according to this disclosure, some components being removed for ease of viewing.
Figure 12:
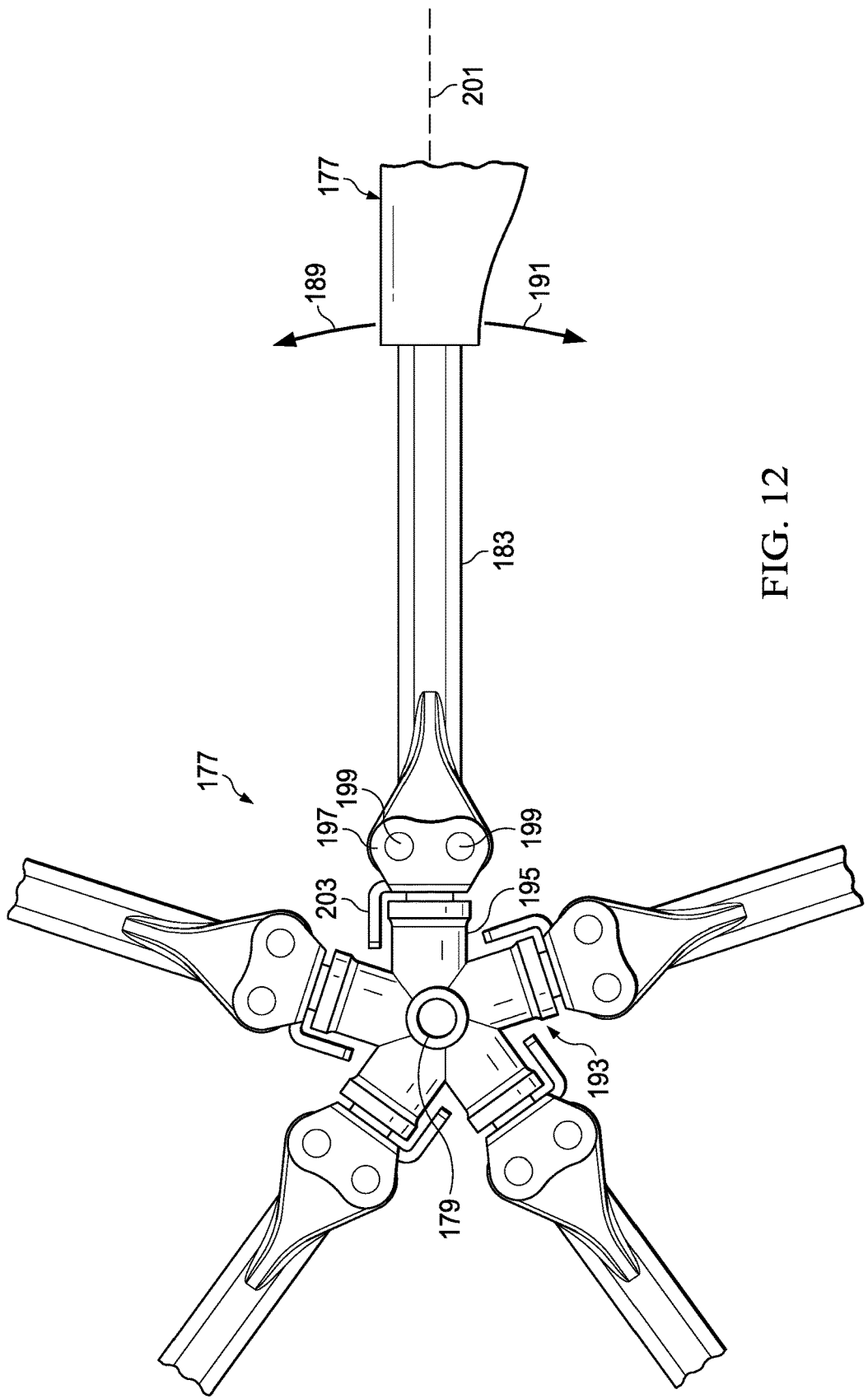
FIG. 12 is an enlarged top view of the rotor assembly of FIG. 11.

FIGS. 11 and 12 illustrate another alternative embodiment of an aircraft rotor assembly 175 according to this disclosure, the views having various components removed for ease of viewing. Rotor assembly 175 has a plurality of blades 177 and is driven in rotation by mast 179 about mast axis 181 by torque provided by an engine of an aircraft (both not shown).

Rotor assembly 175 is unlike configurations described above, in that each blade 177 has an inner flexible portion 183 that allows for out-of-plane flapping motion of the outer portion of blade 177 in directions indicated by arrows 185, 187 and acts as a lead-lag pivot to allow for in-plane lead-lag motions indicated by arrows 189, 191 respectively. In addition, bending of flexible portion 183 creates a biasing force to bias the associated blade 177 toward a neutral lead-lag position relative to a central yoke 193. Each blade 177 is coupled to an arm 195 of yoke 193 with a blade mount 197, each blade 177 rigidly coupled to blade mount 197 by fasteners 199. Bearings within each arm 195 react centrifugal and shear forces of blade 177 and allow for rotation of each blade about pitch axis 201 through force applied to a pitch horn 203 on the associated mount 197.

It should be understood that in one or more of the embodiments shown, the flexural element providing the biasing force may be formed as an integral component of the yoke.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft rotor assembly, comprising:
    a central yoke;
    a plurality of rotor blades coupled to the yoke for rotation with the yoke about an axis, each blade having a Lock number of approximately 5 or greater; and
    a lead-lag pivot for each blade, each pivot being a radial distance from the axis and allowing for in-plane lead-lag motion of the associated blade relative to the yoke, each pivot allowing for in-plane motion from a neutral position of at least 1 degree in each of the lead and lag directions;
    wherein lead and lag motion of each blade is opposed by a biasing force that biases the associated blade toward the neutral position; and wherein the biasing force is selected to achieve a first in-plane frequency of greater than 1/rev for each blade.

2. The assembly of claim 1, wherein each pivot is formed by a bearing carried by the yoke.

3. The assembly of claim 1, wherein each pivot is formed by an inner bearing carried by the yoke, each blade having an associated outer bearing; and
wherein the inner and outer bearings cooperate to define a pitch axis and allow rotation of the associated blade about the pitch axis.

4. The assembly of claim 1, wherein each pivot is formed by a flexible portion of the associated blade, and elastic deformation of the flexible portion produces the biasing force.

5. The assembly of claim 1, further comprising:
a plurality of lead-lag flexures coupled to the yoke and extending radially, each blade being coupled to one of the flexures, and elastic deformation of the flexures producing the biasing force.

6. The assembly of claim 1, further comprising:
a plurality of lead-lag flexures coupled to the yoke and extending radially, each blade being coupled to one of the flexures, and elastic deformation of the flexures producing the biasing force;
wherein the yoke comprises a plurality of arms extending radially, each flexure being coupled to one of the arms, each arm being flexible in torsion; and
wherein elastic torsional deformation of each arm rotates the associated blade about a pitch axis.

7. The assembly of claim 1, further comprising:
a lead-lag flexure for each blade, each flexure coupling the associated blade to the yoke, an out-of-plane bending stiffness of the flexure being greater than an in-plane bending stiffness of the flexure;
wherein elastic deformation of each flexure produces the biasing force for the associated blade.

8. The assembly of claim 1, further comprising:
a lead-lag flexure for each blade, each flexure coupling the associated blade to the yoke, an out-of-plane bending stiffness of the flexure being greater than an in-plane bending stiffness of the flexure;
wherein elastic deformation of each flexure produces the biasing force for the associated blade; and
wherein the flexure is an integral portion of the yoke.

9. The assembly of claim 1, further comprising:
a lead-lag flexure for each blade, each flexure coupling the associated blade to the yoke, an out-of-plane bending stiffness of the flexure being greater than an in-plane bending stiffness of the flexure;
wherein elastic deformation of each flexure produces the biasing force for the associated blade; and
wherein the flexure is a separate component coupled to the yoke.

10. The assembly of claim 1, further comprising:
a plurality of elastic springs, the springs coupling each blade to each adjacent blade;
wherein elastic deformation of each spring produces the biasing force for the associated blades.

11. The assembly of claim 1, further comprising:
a plurality of damper-less elastic springs, the springs coupling each blade to each adjacent blade;
wherein elastic deformation of each spring produces the biasing force for the associated blades.

12. The assembly of claim 1, further comprising:
a plurality of elastomeric springs, the springs coupling each blade to each adjacent blade;
wherein elastic deformation of each spring produces the biasing force for the associated blades.

13. The assembly of claim 1, further comprising:
a flap hinge for each blade formed by at least one bearing carried within the yoke.

14. The assembly of claim 1, further comprising:
a flap hinge for each blade formed by at least one bearing coupled to the yoke.

15. The assembly of claim 1, further comprising:
a flap hinge for each blade formed by a flexible portion of the yoke.

16. The assembly of claim 1, further comprising:
a control system for collective and cyclic control of the pitch of each of the blades.

17. An aircraft rotor assembly, comprising:
a central yoke;
a plurality of rotor blades coupled to the yoke for rotation with the yoke about an axis, each blade having a Lock number of approximately 5 or greater;
a lead-lag pivot for each blade formed by a bearing carried by the yoke, each pivot being a radial distance from the axis and allowing for in-plane lead-lag motion of the associated blade relative to the yoke, each pivot allowing for in-plane motion from a neutral position of at least 1 degree in each of the lead and lag directions;
wherein lead-lag motion of each blade is opposed by a biasing force biasing the blade toward the neutral position;
wherein the biasing force is selected to achieve a first in-plane frequency of greater than 1/rev for each blade.

18. The assembly of claim 17, further comprising:
a lead-lag flexure for each blade, each flexure coupling the associated blade to the yoke, an out-of-plane bending stiffness of the flexure being greater than an in-plane bending stiffness of the flexure;
wherein elastic deformation of each flexure produces the biasing force for the associated blade.

19. The assembly of claim 17, further comprising:
a plurality of elastic springs, the springs coupling each blade to each adjacent blade;
wherein elastic deformation of each spring produces the biasing force for the associated blades.

20. An aircraft rotor assembly, comprising:
a central yoke;
a plurality of rotor blades coupled to the yoke for rotation with the yoke about an axis, each blade having a Lock number of approximately 5 or greater;
a lead-lag pivot for each blade formed by at least one of a flexible portion of the associated blade and a flexible portion of the yoke, each pivot being a radial distance from the axis and allowing for in-plane lead-lag motion of the associated blade relative to the yoke, each pivot allowing for in-plane motion from a neutral position of at least 1 degree in each of the lead and lag directions;
wherein elastic deformation of the flexible portion produces a biasing force for biasing the associated blade toward the neutral position,
wherein the biasing force is selected to achieve a first in-plane frequency of greater than 1/rev for each blade.

* * * * *